(12) United States Patent
Itano et al.

(10) Patent No.: US 12,241,014 B2
(45) Date of Patent: *Mar. 4, 2025

(54) COMPOSITION CONTAINING REFRIGERANT, USE OF SAME, REFRIGERATOR COMPRISING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 520 days.

This patent is subject to a terminal disclaimer.

(21) Appl. No.: 17/551,792

(22) Filed: Dec. 15, 2021

(65) Prior Publication Data

US 2022/0106511 A1 Apr. 7, 2022

Related U.S. Application Data

(63) Continuation of application No. PCT/JP2020/024152, filed on Jun. 19, 2020.

(30) Foreign Application Priority Data

Jun. 19, 2019 (JP) .................................. 2019-114162

(51) Int. Cl.
*C09K 5/04* (2006.01)

(52) U.S. Cl.
CPC .................................. *C09K 5/045* (2013.01)

(58) Field of Classification Search
CPC .......... C09K 5/04; C09K 5/041; C09K 5/044; C09K 5/045; C09K 2205/122; C09K 2205/126; C09K 2205/22; C09K 2205/40
See application file for complete search history.

(56) References Cited

U.S. PATENT DOCUMENTS

2017/0002245 A1* 1/2017 Fukushima ............ C09K 5/045
2017/0174967 A1 6/2017 Itano et al.

FOREIGN PATENT DOCUMENTS

| JP | 2012-526182 | 10/2012 |
| JP | 2013-529703 | 7/2013 |
| JP | 2015-511262 | 4/2015 |
| JP | 2016-156001 | 9/2016 |
| WO | 2010/129920 | 11/2010 |
| WO | 2011/163117 | 12/2011 |
| WO | 2013/122892 | 8/2013 |

(Continued)

OTHER PUBLICATIONS

International Search Report issued Sep. 15, 2020 in International (PCT) Application No. PCT/JP2020/024152.

(Continued)

*Primary Examiner* — Matthew R Diaz
(74) *Attorney, Agent, or Firm* — Wenderoth, Lind & Ponack, L.L.P.

(57) ABSTRACT

Provided is a novel, low-GWP mixed refrigerant. A composition contains a refrigerant that contains trans-1,2-difluoroethylene (HFO-1132(E)), trifluoroethylene (HFO-1123), and 1,3,3,3-tetrafluoropropene (R1234ze).

6 Claims, 2 Drawing Sheets

(56) References Cited

FOREIGN PATENT DOCUMENTS

WO      2015/141678      9/2015
WO      WO-2015141678 A1 *      9/2015   ............. C09K 5/045

OTHER PUBLICATIONS

Extended European Search Report issued Aug. 11, 2023 in European Patent Application No. 20826285.7.
International Preliminary Report on Patentability issued Dec. 21, 2021 in International (PCT) Patent Application No. PCT/JP2020/024152.

* cited by examiner

COMPOSITION CONTAINING REFRIGERANT, USE OF SAME, REFRIGERATOR COMPRISING SAME, AND METHOD FOR OPERATING SAID REFRIGERATOR

TECHNICAL FIELD

The present disclosure relates to a composition containing a refrigerant, use of the composition, a refrigerating machine containing the composition, and a method for operating the refrigerating machine.

BACKGROUND ART

R404A is currently used as a refrigerant for freezing equipment for commercial use. R404A is a three-component mixture refrigerant composed of pentafluoroethane (R125) (44%), 1,1,1-trifluoroethane (R143a) (52%), and 1,1,1,2-tetrafluoroethane (R134a) (4%). However, the global warming potential (GWP) of R404A is 3920. Due to growing concerns over global warming, there is demand for refrigerants with a lower GWP. For this reason, various low-GWP mixed refrigerants that can replace R404A have been proposed (PTL 1 to 5).

CITATION LIST

Patent Literature

PTL 1: JP2012-526182A
PTL 2: JP2013-529703A
PTL 3: JP2015-511262A
PTL 4: JP2016-156001A
PTL 5: WO2015/141678A

SUMMARY

A composition comprising a refrigerant, the refrigerant comprising trans-1,2-difluoroethylene (HFO-1132(E)), trifluoroethylene (HFO-1123), and 1,3,3,3-tetrafluoropropene (R1234ze).

Advantageous Effects

The refrigerant according to the present disclosure has a low GWP.

DESCRIPTION OF EMBODIMENTS

Figure 1:
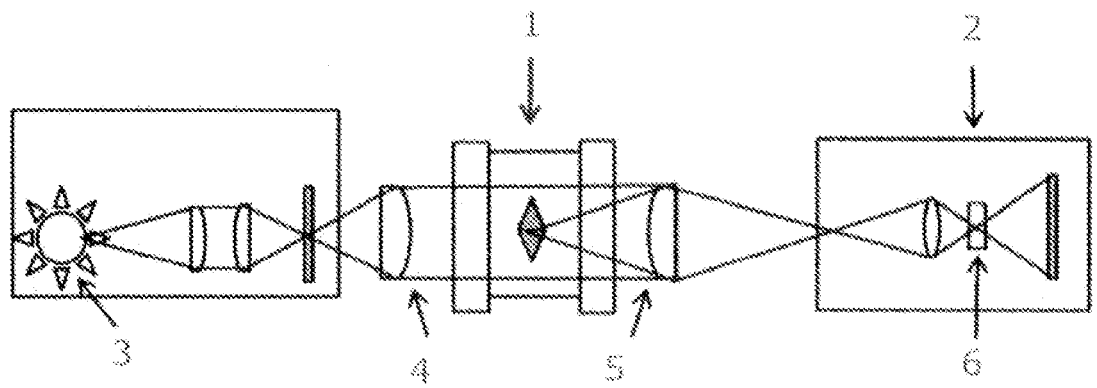
FIG. 1 is a schematic view of an apparatus used in a flammability test.
Figure 2:
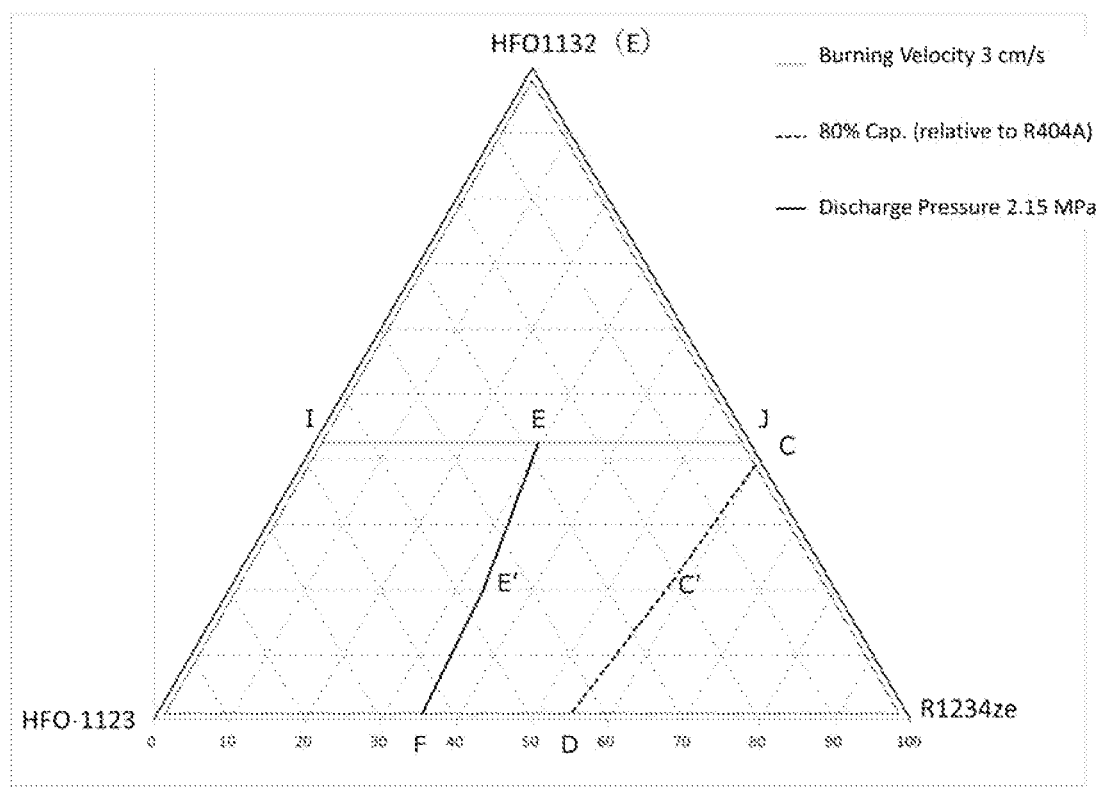
FIG. 2 is a diagram showing points C to F, I, and J, and line segments that connect these points to each other in a ternary composition diagram in which the sum of HFO-1132 (E), HFO-1123, and R1234ze is 100 mass %.
Figure 3:
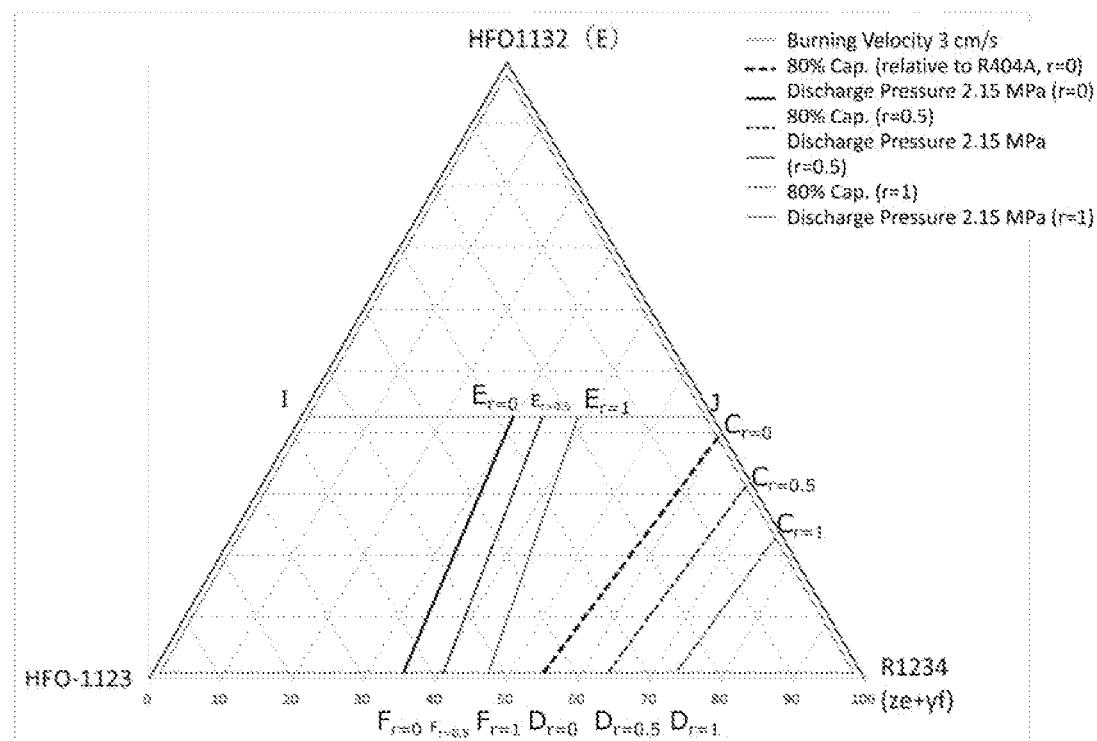
FIG. 3 is a diagram showing points $C_r$ to $F_r$, I, and J, and line segments that connect these points to each other in a ternary composition diagram in which the sum of HFO-1132 (E), HFO-1123, R1234ze, and R1234yf is 100 mass %.

The present inventors conducted intensive research to solve the above problem, and found that a mixed refrigerant containing trans-1,2-difluoroethylene (HFO-1132(E)), trifluoroethylene (HFO-1123), and 1,3,3,3-tetrafluoropropene (R1234ze) has the above properties.

The present disclosure was completed as a result of further research based on this finding. The present disclosure includes the following embodiments.

Definition of Terms

In the present disclosure, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), and ammonia (R717).

In the present disclosure, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present disclosure, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present disclosure, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use achieved with the first refrigerant by using the second refrigerant. This type of alternative means that the same use is achieved with an alternative refrigerant.

In the present disclosure, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

1. Refrigerant 1.1 Refrigerant Component

The refrigerant according to the present disclosure contains trans-1,2-difluoroethylene (HFO-1132(E)), trifluoroethylene (HFO-1123), and 1,3,3,3-tetrafluoropropene (R1234ze).

The refrigerant according to the present disclosure has a low GWP.

The refrigerant is preferably as follows: when the mass % of HFO-1132(E), HFO-1123, and R1234ze based on their sum in the refrigerant is respectively x, y, and z, coordinates (x,y,z) in a ternary composition diagram in which the sum of HFO-1132(E), HFO-1123, and R1234ze is 100 mass % fall within a figure surrounded by line segments EJ, JC, CD, DF, and FE, which connect the following 5 points, or fall on any of line segments EJ, CD, and FE, but not fall on point J, point C, point D, or point F:

point E (42.5, 27.9, 29.6),
point J (42.5, 1.0, 56.5),
point C (39.1, 1.0, 59.9),
point D (1.0, 44.0, 54.6), and
point F (1.0, 64.0, 35.0),
 line segments EJ, JC, and DF are straight lines,
 coordinates (x,y,z) of a point on line segment CD are represented by (x, $0.0021x^2-1.2228x+45.621$, $-0.0021x^2+0.2228x+54.379$), and
 coordinates (x,y,z) of a point on line segment FE are represented by (x, $0.0025x^2-0.979x+64.976$, $-0.0025x^2-0.021x+35.024$).

In this case, the refrigerant according to the present disclosure has a GWP of 4 or less, a burning velocity of 3 cm/s or less in its most flammable formulation in accordance with U.S. ANSI/ASHRAE Standard 34-2013 (worst case of formulation for flammability: WCF), a refrigerating capacity of 80% or more relative to R404A, and a discharge pressure of 2.15 MPa or less.

The refrigerant according to the present disclosure may further contain other additional refrigerants in addition to HFO-1132(E), HFO-1123, and R1234ze, as long as the above properties and effects are not impaired. In this respect, the refrigerant according to the present disclosure contains HFO-1132(E), HFO-1123, and R1234ze in a total amount of preferably 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may contain a single additional refrigerant, or two or more additional refrigerants.

The refrigerant according to the present disclosure may further contain 2,3,3,3-tetrafluoropropene (R1234yf).

When the refrigerant according to the present disclosure further contains R1234yf, the refrigerant is preferably as follows: when the mass % of HFO-1132(E) is x, the mass % of HFO-1123 is y, the total mass % of R1234ze and R1234yf is z based on the sum of HFO-1132(E), HFO-1123, R1234ze, and R1234yf, and the mass ratio of R1234yf to the sum of R1234ze and R1234yf is r (0<r<1) in the refrigerant, coordinates (x,y,z) in a ternary composition diagram in which the sum of HFO-1132(E), HFO-1123, R1234ze, and R1234yf is 100 mass % fall within a figure surrounded by line segments $E_rJ_r$, $J_rC_r$, $C_rD_r$, $D_rF_r$, and $F_rE_r$, which connect the following 5 points, or fall on any of line segments $E_rJ_r$, $C_rD_r$, and $F_rE_r$, but not fall on point $J_r$, point $C_r$, point $D_r$, or point $F_r$, point $E_r$ (42.5, $-1.4r^2-7.7r+27.9$, $1.4r^2+7.7r+29.6$),
point $J_r$ (42.5, 1.0, 56.5),
point $C_r$ ($-0.8r^2-15.4r+39.1$, 1.0, $0.8r^2+15.4r+59.9$),
point $D_r$ (1.0, $-r^2-17.5r+44.4$, $r^2+17.5r+54.6$), and
point $F_r$ (1.0, $-1.4r^2-10.5r+64.0$, $1.4r^2+10.5r+35.0$), and
 line segments $E_rJ_r$, $J_rC_r$, $C_rD_r$, $D_rF_r$, and $F_rE_r$ are represented by a straight line.

In this case, the refrigerant according to the present disclosure has a burning velocity of 3 cm/s or less, a refrigerating capacity of 80% or more relative to R404A, and a discharge pressure of 2.15 MPa or less.

When the refrigerant according to the present disclosure further contains R1234yf, the refrigerant according to the present disclosure may further contain other additional refrigerants in addition to HFO-1132(E), HFO-1123, R1234ze, and R1234yf, as long as the above properties and effects are not impaired. In this respect, the refrigerant according to the present disclosure contains HFO-1132(E), HFO-1123, R1234ze, and R1234yf in a total amount of preferably 99.5 mass % or more, more preferably 99.75 mass % or more, and still more preferably 99.9 mass % or more, based on the entire refrigerant.

Such additional refrigerants that can be contained in the refrigerant further containing R1234yf according to the present disclosure are not limited, and can be selected from a wide range of refrigerants. The mixed refrigerant may contain a single additional refrigerant, or two or more additional refrigerants.

1.2 Use

The refrigerant according to the present disclosure can be preferably used as a working fluid in a refrigerating machine.

The refrigerant according to the present disclosure is suitable for use as an alternative refrigerant for R404A.

2. Refrigerant Composition

The refrigerant composition according to the present disclosure contains at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further contains at least one other component in addition to the refrigerant according to the present disclosure. The refrigerant composition according to the present disclosure may contain at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially contain a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may contain a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, hydrochlorofluorocarbon, chlorofluorocarbon, hydrochlorocarbon, fluorocarbon, or fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain a tracer in a total amount of about 10 parts per million by weight (ppm) to about 1000 ppm based on the entire refrigerant composition. The refrigerant composition according to the present disclosure may contain a tracer in a total amount of preferably about 30 ppm to about 500 ppm, and more preferably about 50 ppm to about 300 ppm, based on the entire refrigerant composition.

2.3. Ultraviolet Fluorescent Dye

The refrigerant composition according to the present disclosure may contain a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may contain a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitrobenzene and nitrostyrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may contain a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure contains at least the refrigerant or refrigerant composition according to the present disclosure and a refrigeration oil, and is used as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally contains 10 to 50 mass % of refrigeration oil.

3.1. Refrigeration Oil

The refrigeration oil-containing working fluid according to the present disclosure may contain a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3.2. Compatibilizing Agent

The refrigeration oil-containing working fluid according to the present disclosure may contain a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure includes circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132(E)), trifluoroethylene (HFO-1123), and 1,3,3,3-tetrafluoropropene (R1234ze).

Item 2.

The composition according to item 1,
wherein
when the mass % of HFO-1132(E), HFO-1123, and R1234ze based on their sum in the refrigerant is respectively x, y, and z, coordinates (x,y,z) in a ternary composition diagram in which the sum of HFO-1132(E), HFO-1123, and R1234ze is 100 mass % fall within a figure surrounded by line segments EJ, JC, CD, DF, and FE, which connect the following 5 points, or fall on any of line segments EJ, CD, and FE, but not fall on point J, point C, point D, or point F:
point E (42.5, 27.9, 29.6),
point J (42.5, 1.0, 56.5),
point C (39.1, 1.0, 59.9),
point D (1.0, 44.4, 54.6), and
point F (1.0, 64.0, 35.0),
line segments EJ, JC, and DF are straight lines,
coordinates (x,y,z) of a point on line segment CD are represented by (x, $0.0021x^2-1.2228x+45.621$, $-0.0021x^2+0.2228x+54.379$), and
coordinates (x,y,z) of a point on line segment FE are represented by (x, $0.0025x^2-0.979x+64.976$, $-0.0025x^2-0.021x+35.024$).

Item 3.

The composition according to Item 1 or 2, wherein the refrigerant further comprises 2,3,3,3-tetrafluoropropene (R1234yf).

Item 4.

The composition according to Item 3,
wherein
when the mass % of HFO-1132(E) is x, the mass % of HFO-1123 is y, the total mass % of R1234ze and R1234yf is z based on the sum of HFO-1132(E), HFO-1123, R1234ze, and R1234yf, and the mass ratio of R1234yf to the sum of R1234ze and R1234yf is r in the refrigerant,
in a ternary composition diagram in which the sum of HFO-1132(E), HFO-1123, R1234ze, and R1234yf is 100 mass %,
when 1>r>0, coordinates (x,y,z) fall within a figure surrounded by line segments $E_rJ_r$, $J_rC_r$, $C_rD_r$, $D_rF_r$, and $F_rE_r$, which connect the following 5 points, or fall on any of line segments $E_rJ_r$, $C_rD_r$, and $F_rE_r$, but not fall on point $J_r$, point $C_r$, point $D_r$, or point $F_r$:
point $E_r$ (42.5, $-1.4r^2-7.7r+27.9$, $1.4r^2+7.7r+29.6$),
point $J_r$ (42.5, 1.0, 56.5),
point $C_r$ ($-0.8r^2-15.4r+39.1$, 1.0, $0.8r^2+15.4r+59.9$),
point $D_r$ (1.0, $-r^2-17.5r+44.4$, $r^2+17.5r+54.6$), and
point $F_r$ (1.0, $-1.4r^2-10.5r+64.0$, $1.4r^2+10.5r+35.0$), and
line segments $E_rJ_r$, $J_rC_r$, $C_rD_r$, $D_rF_r$, and $F_rE_r$ are represented by a straight line.

Item 5.

The composition according to any one of Items 1 to 4, which is for use as a working fluid for a refrigerating machine, the composition further comprising a refrigeration oil.

Item 6.

The composition according to any one of Items 1 to 5, which is for use as an alternative refrigerant for R404A.

Item 7.

Use of the composition of any one of Items 1 to 5 as an alternative refrigerant for R404A.

Item 8.

A refrigerating machine comprising the composition of any one of Items 1 to 5 as a working fluid.

Item 9.

A method for operating a refrigerating machine, comprising circulating the composition of any one of Items 1 to 5 as a working fluid in a refrigerating machine.

EXAMPLES

The present disclosure is described in more detail below with reference to Examples. However, the present disclosure is not limited to the Examples.

Example A

Mixed refrigerants were prepared by mixing HFO-1132 (E), HFO-1123, and R1234ze in mass % shown in Table 1 based on their sum.

The GWP of R404A (R125=44%/R143A=52%/R134A=4%) and the mixed refrigerants was evaluated based on the values stated in the Intergovernmental Panel on Climate Change (IPCC), fourth assessment report. The GWP of HFO-1132(E), which was not stated therein, was assumed to be 1 from HFO-1132a (GWP=1 or less) and HFO-1123 (GWP=0.3, described in PTL 1). The refrigerating capacity of R404A and the mixed refrigerants was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP and refrigerating capacity of these mixed refrigerants relative to those of R404A were determined. The computational conditions were as follows.

Evaporating temperature: −40° C.
Condensation temperature: 40° C.
Superheating temperature: 20K
Subcooling temperature: 0K
Compressor efficiency: 70%

Tables 1 to 3 show these values together with the GWP of each mixed refrigerant. The COP and refrigerating capacity are percentages relative to R410A.

The coefficient of performance (COP) was determined by the following formula.

COP=(refrigerating capacity or heating capacity)/power consumption

Sb: flame propagation velocity (cm/s)
ρu: adiabatic flame temperature (unburned)
ρb: adiabatic flame temperature (burned)

Sb was determined from the schlieren video images. ρu was calculated from a measurement temperature, and ρb was calculated from the combustion heat and isobaric specific heat of combustion gas.

Table 2 shows the results.

TABLE 2

| Item | Unit | I | E | J |
|---|---|---|---|---|
| HFO-1132E | mass % | 42.5 | 42.5 | 42.5 |
| HFO-1123 | mass % | 56.5 | 27.9 | 1.0 |
| R1234ze | mass % | 1.0 | 29.6 | 56.5 |
| Burning Velocity | cm/s | 3 | 3 | 3 |

These results indicate that the mixed refrigerant is preferably as follows: when the mass % of HFO-1132(E), HFO-1123, and R1234ze based on their sum in the refrigerant is respectively x, y, and z, coordinates (x,y,z) in a ternary composition diagram in which the sum of HFO-1132(E), HFO-1123, and R1234ze is 100 mass % fall within a figure surrounded by line segments EJ, JC, CD, DF, and FE, which connect the following 5 points, or fall on any of line segments EJ, CD, and FE, but not fall on point J, point C, point D, or point F:

TABLE 1

| Item | Unit | Com Ex1 | Example1 C | Example2 C' | Example3 D | Example4 E | Example5 E' | Example6 F | Com Ex2 I | Example7 J |
|---|---|---|---|---|---|---|---|---|---|---|
| HFO-1132 (E) | Mass % | R404A | 39.1 | 20.0 | 1.0 | 42.5 | 20.0 | 1.0 | 42.5 | 42.5 |
| HFO-1123 | Mass % | | 1.0 | 22.0 | 44.4 | 27.9 | 46.4 | 64.0 | 56.5 | 1.0 |
| R1234ze | Mass % | | 59.9 | 58.0 | 54.6 | 29.6 | 33.6 | 35.0 | 1.0 | 56.5 |
| GWP | — | 3922 | 4 | 4 | 4 | 2 | 3 | 3 | 1 | 4 |
| COP ratio | % (Relative to R404A) | 100 | 109 | 105 | 101 | 102 | 99 | 97 | 96 | 109 |
| Refrigerating Capacity Ratio | % (Relative to R404A) | 100 | 80 | 80 | 80 | 118 | 111 | 106 | 166 | 84 |
| Discharge Pressure | Mpa | 1.82 | 1.51 | 1.61 | 1.71 | 2.15 | 2.15 | 2.15 | 2.83 | 1.57 |
| Condensation Glide | ° C. | 0.3 | 9.2 | 11.9 | 12.8 | 6.2 | 7.8 | 8.4 | 0.5 | 8.7 |

A burning velocity test was performed in accordance with 6.1.3 Flammability Classification in ANSI/ASHRAE Standard 34-2013 by using the apparatus shown in FIG. 1 as follows. First, the mixed refrigerants were purified to 99.5% or more, and were deaerated by repeating a cycle of freezing, pumping, and thawing until no traces of air were observed on the vacuum gauge. The burning velocity was measured by a closed method. The initial temperature was the ambient temperature. Ignition was performed by generating an electrical spark between the electrodes in the center of the sample cell. The duration of the discharge was 1.0 to 9.9 ms, and the ignition energy was typically about 0.1 to 1.0 J. The propagation of the flame was visualized by schlieren photography. A cylindrical container (inner diameter: 155 mm, length: 198 mm) equipped with two light-transmissive acrylic windows was used as the sample cell, and a xenon lamp was used as the light source. The propagation of flame was filmed with a schlieren system using a collimating lens and a high-speed digital video camera (frame rate: 600 fps), and recorded as video data on a PC. The burning velocity (Su (cm/s)) is expressed by the volume of unburned gas consumed by the flame surface of a unit area per unit time and was calculated by using the following formula.

$Su = Sb * \rho u / \rho b$ point E (42.5, 27.9, 29.6),
point J (42.5, 1.0, 56.5),
point C (39.1, 1.0, 59.9),
point D (1.0, 44.4, 54.6), and
point F (1.0, 64.0, 35.0), line segments EJ, JC, and DF are straight lines, coordinates (x,y,z) of a point on line segment CD are represented by (x, $0.0021x^2 - 1.2228x + 45.621$, $-0.0021x^2 + 0.2228x + 54.379$), and coordinates (x,y,z) of a point on line segment FE are represented by (x, $0.0025x^2 - 0.979x + 64.976$, $-0.0025x^2 - 0.021x + 35.024$).

In this case, the refrigerant according to the present disclosure has a GWP 4 or less, a burning velocity of 3 cm/s or less in its most flammable formulation (worst case of formulation for flammability: WCF) in accordance with U.S. ANSI/ASHRAE Standard 34-2013, a refrigerating capacity of 80% or more relative to R404A, and a discharge pressure of 2.15 MPa or less. The approximate expressions that represent the line segments connecting the points were each determined as described below.

TABLE 3

| Item | Unit | Example1 C | Example2 C' | Example3 D | Example4 E | Example5 E' | Example6 F |
|---|---|---|---|---|---|---|---|
| HFO-1132 (E) | Mass % | 39.1 | 20.0 | 1.0 | 42.5 | 20.0 | 1.0 |
| HFO-1123 | Mass % | 1.0 | 22.0 | 44.4 | 27.9 | 46.4 | 64.0 |
| R1234ze | Mass % | 59.9 | 58.0 | 54.6 | 29.6 | 33.6 | 35.0 |
| x = HFO-1132 (E) | | | x | | | x | |
| Approximate Expression of R32 | | $0.0021x^2 - 1.2228x + 45.621$ | | | $0.0025x^2 - 0.979x + 64.976$ | | |
| Approximate Expression of R1234ze | | $-0.0021x^2 + 0.2228x + 54.379$ | | | $-0.0025x^2 - 0.021x + 35.024$ | | |

Example B

Mixed refrigerants were prepared by mixing HFO-1132(E), HFO-1123, R1234ze, and R1234yf in mass % based on their sum as shown in Table 4.

The COP and refrigerating capacity of these mixed refrigerants relative to those of R404A were determined in the same manner as in Example A. Table 4 shows these values together with the GWP of each mixed refrigerant. The COP and refrigerating capacity are percentages relative to R404A.

TABLE 4

| Item | Unit | Example8 $C_{r=0.5}$ | Example9 $D_{r=0.5}$ | Example10 $E_{r=0.5}$ | Example11 $F_{r=0.5}$ | Com Ex3 $I_{r=0.5}$ | Example12 $J_{r=0.5}$ |
|---|---|---|---|---|---|---|---|
| HFO-1132 (E) | Mass % | 31.2 | 1.0 | 42.5 | 1.0 | 42.5 | 42.5 |
| HFO-1123 | Mass % | 1.0 | 35.4 | 23.7 | 58.4 | 56.5 | 1.0 |
| R1234(ze + yf) r = 0.5 | Mass % | 33.9 | 31.8 | 16.9 | 20.3 | 0.5 | 28.2 |
| GWP | — | 4 | 4 | 2 | 3 | 1 | 3 |
| COP ratio | % (Relative to R404A) | 107 | 102 | 102 | 97 | 96 | 107 |
| Refrigerating Capacity Ratio | % (Relative to R404A) | 80 | 80 | 120 | 108 | 167 | 93 |
| Condensation Glide | °C. | 7.6 | 11.2 | 5.2 | 7.6 | 0.4 | 6.5 |
| Discharge Pressure | Mpa | 1.51 | 1.67 | 2.15 | 2.15 | 2.83 | 1.69 |

| Item | Unit | Example13 $C_{r=1.0}$ | Example14 $D_{r=1.0}$ | Example15 $E_{r=1.0}$ | Example16 $F_{r=1.0}$ | Com Ex4 $I_{r=1.0}$ | Example17 $J_{r=1.0}$ |
|---|---|---|---|---|---|---|---|
| HFO-1132 (E) | Mass % | 22.9 | 1.0 | 42.5 | 1.0 | 42.5 | 42.5 |
| HFO-1123 | Mass % | 1.0 | 25.9 | 18.8 | 52.1 | 56.5 | 1.0 |
| R1234(ze + yf) r = 1.0 | Mass % | 0.0 | 0.0 | 0.0 | 0.0 | 0.0 | 0.0 |
| GWP | — | 3 | 3 | 2 | 2 | 1 | 3 |
| COP ratio | % (Relative to R404A) | 105 | 102 | 102 | 97 | 96 | 105 |
| Refrigerating Capacity Ratio | % (Relative to R404A) | 80 | 80 | 123 | 110 | 167 | 102 |
| Condensation Glide | °C. | 6.1 | 9.5 | 4.1 | 6.8 | 0.4 | 4.6 |
| Discharge Pressure | Mpa | 1.50 | 1.61 | 2.15 | 2.15 | 2.84 | 1.80 |

Additionally, a burning velocity test was performed on the mixed refrigerants of HFO-1132(E), HFO-1123, R1234ze, and R1234yf in the same manner as in Example A. Table 5 shows the formulations at which the burning velocity (Sb) (cm/sec) is 3 cm/s.

TABLE 5

| Item | Unit | $I_{r=0.5}$ | $E_{r=0.5}$ | $J_{r=0.5}$ | $I_{r=1.0}$ | $E_{r=1.0}$ | $J_{r=1.0}$ |
|---|---|---|---|---|---|---|---|
| HFO-1132E | mass % | 42.5 | 42.5 | 42.5 | 42.5 | 42.5 | 42.5 |
| HFO-1123 | mass % | 56.5 | 23.7 | 1 | 56.5 | 18.8 | 1 |
| R1234(ze + yf) | mass % | 1 | 33.8 | 56.5 | 1 | 38.7 | 56.5 |
| Burning Velocity | cm/s | 3 | 3 | 3 | 3 | 3 | 3 |

These results indicate that the mixed refrigerant containing HFO-1132(E), HFO-1123, R1234ze, and R1234yf has a burning velocity of 3 cm/s or less, a refrigerating capacity of 80% or more relative to R404A, and a discharge pressure of 2.15 MPa or less, when the mixed refrigerant is as follows: when the mass % of HFO-1132(E) is x, the mass % of HFO-1123 is y, the total mass % of R1234ze and R1234yf is z based on their sum, and the mass ratio of R1234yf to the sum of R1234ze and R1234yf is r (0<r<1) in the refrigerant, coordinates (x,y,z) in a ternary composition diagram in which the sum of HFO-1132(E), HFO-1123, R1234ze, and R1234yf is 100 mass % fall within a figure surrounded by line segments $E_rJ_r$, $J_rC_r$, $C_rD_r$, $D_rF_r$, and $F_rE_r$, which connect the following 5 points, or fall on any of line segments $E_rJ_r$, $C_rD_r$, and $F_rE_r$, but not fall on point $J_r$, point $C_r$, point $D_r$, or point $F_r$, point $E_r$ (42.5, $-1.4r^2-7.7r+27.9$, $1.4r^2+7.7r+29.6$), point $J_r$ (42.5, 1.0, 56.5), point $C_r$ ($-0.8r^2-15.4r+39.1$, 1.0, $0.8r^2+15.4r+59.9$), point $D_r$ (1.0, $-r^2-17.5r+44.4$, $r^2+17.5r+54.6$), and point $F_r$ (1.0, $-1.4r^2-10.5r+64.0$, $1.4r^2+10.5r+35.0$), and line segments $E_rJ_r$, $J_rC_r$, $C_rD_r$, $D_rF_r$, and $F_rE_r$ are represented by a straight line.

The coordinates of each point was determined by using an approximate expression in the following manner.

TABLE 6

| Item | Unit | $C_r$ (r = R1234yf/(R1234(ze + yf)) | | | $D_r$ (r = R1234yf/(R1234(ze + yf)) | | |
|---|---|---|---|---|---|---|---|
| | | 0.0 | 0.5 | 1.0 | 0.0 | 0.5 | 1.0 |
| HFO-1132E | mass % | 39.1 | 31.2 | 22.9 | 1.0 | 1.0 | 1.0 |
| HFO-1123 | mass % | 1.0 | 1.0 | 1.0 | 44.4 | 35.4 | 25.9 |
| R1234(ze + yf) | mass % | 59.9 | 67.8 | 76.1 | 54.6 | 63.6 | 73.1 |
| x = HFO-1132 (E) | | $-0.8r^2 - 15.4r + 39.1$ | | | 1.0 | | |
| y = R32 | | 1.0 | | | $-r^2 - 17.5r + 44.4$ | | |
| z = R1234(ze + yf) | | $0.8r^2 + 15.4r + 59.9$ | | | $r^2 + 17.5r + 54.6$ | | |

| Item | Unit | $E_r$ (r = R1234yf/(R1234(ze + yf)) | | | $F_r$ (r = R1234yf/(R1234(ze + yf)) | | |
|---|---|---|---|---|---|---|---|
| | | 0.0 | 0.5 | 1.0 | 0.0 | 0.5 | 1.0 |
| HFO-1132E | mass % | 42.5 | 42.5 | 42.5 | 1.0 | 1.0 | 1.0 |
| HFO-1123 | mass % | 27.9 | 23.7 | 18.8 | 64.0 | 58.4 | 52.1 |
| R1234(ze + yf) | mass % | 29.6 | 33.8 | 38.7 | 35.0 | 40.6 | 46.9 |
| x = HFO-1132 (E) | | 42.5 | | | 1.0 | | |
| y = R32 | | $-1.4r^2 - 7.7r + 27.9$ | | | $-1.4r^2 - 10.5r + 64.0$ | | |
| z = R1234(ze + yf) | | $1.4r^2 + 7.7r + 29.6$ | | | $1.4r^2 + 10.5r + 35.0$ | | |

| Item | Unit | $I_r$ (r = R1234yf/(R1234(ze + yf)) | | | $J_r$ (r = R1234yf/(R1234(ze + yf)) | | |
|---|---|---|---|---|---|---|---|
| | | 0.0 | 0.5 | 1.0 | 0.0 | 0.5 | 1.0 |
| HFO-1132E | mass % | 42.5 | 42.5 | 42.5 | 42.5 | 42.5 | 42.5 |
| HFO-1123 | mass % | 56.5 | 56.5 | 56.5 | 1.0 | 1.0 | 1.0 |
| R1234(ze + yf) | mass % | 1.0 | 1.0 | 1.0 | 56.5 | 56.5 | 56.5 |
| x = HFO-1132 (E) | | 42.5 | | | 42.5 | | |
| y = R32 | | 56.5 | | | 1.0 | | |
| z = R1234(ze + yf) | | 1.0 | | | 56.5 | | |

Example C

Mixed refrigerants were prepared by mixing HFO-1132 (E), HFO-1123, R1234ze, and R1234yf in mass % based on their sum as shown in Tables 7 to 144 to 11.

The COP and refrigerating capacity of these mixed refrigerants relative to those of R404A were determined in the same manner as in Example A. Tables 7 to 14 show these values together with the GWP of each mixed refrigerant. The COP and refrigerating capacity are percentages relative to R404A.

TABLE 7

| Item | Unit | Com Ex5 | Com Ex6 | Com Ex7 | Com Ex8 | Com Ex9 | Com Ex10 | Com Ex11 | Com Ex12 |
|---|---|---|---|---|---|---|---|---|---|
| HFO-1132 (E) | Mass % | 45.0 | 40.0 | 35.0 | 30.0 | 25.0 | 20.0 | 15.0 | 10.0 |
| HFO-1123 | Mass % | 30.0 | 35.0 | 40.0 | 45.0 | 50.0 | 55.0 | 60.0 | 60.0 |
| R1234(ze + yf) r = 0 | Mass % | 25.0 | 25.0 | 25.0 | 25.0 | 25.0 | 25.0 | 25.0 | 30.0 |
| GWP | — | 2 | 2 | 2 | 2 | 2 | 2 | 2 | 3 |
| COP ratio | % (Relative to R404A) | 101 | 100 | 100 | 99 | 98 | 97 | 96 | 97 |
| Refrigerating Capacity Ratio | % (Relative to R404A) | 125 | 125 | 125 | 125 | 125 | 124 | 124 | 115 |
| Condensation Glide | Mpa | 5.3 | 5.4 | 5.6 | 5.6 | 5.7 | 5.8 | 5.8 | 7.1 |
| Discharge Pressure | ° C. | 2.24 | 2.27 | 2.29 | 2.31 | 2.34 | 2.35 | 2.37 | 2.26 |

| Item | Unit | Com Ex13 | Com Ex14 | Example18 | Example19 | Example20 | Example21 | Example22 | Example23 |
|---|---|---|---|---|---|---|---|---|---|
| HFO-1132 (E) | Mass % | 5.0 | 45.0 | 40.0 | 35.0 | 30.0 | 25.0 | 20.0 | 15.0 |
| HFO-1123 | Mass % | 65.0 | 20.0 | 25.0 | 30.0 | 35.0 | 40.0 | 45.0 | 50.0 |
| R1234(ze + yf) r = 0 | Mass % | 30.0 | 35.0 | 35.0 | 35.0 | 35.0 | 35.0 | 35.0 | 35.0 |
| GWP | — | 3 | 3 | 3 | 3 | 3 | 3 | 3 | 3 |
| COP ratio | % (Relative to R404A) | 96.1 | 103.6 | 102.7 | 101.9 | 101.1 | 100.3 | 99.5 | 98.8 |
| Refrigerating Capacity Ratio | % (Relative to R404A) | 114.5 | 110.7 | 110.7 | 110.5 | 110.2 | 109.9 | 109.3 | 108.7 |
| Condensation Glide | Mpa | 7.1 | 6.9 | 7.3 | 7.5 | 7.8 | 8.0 | 8.1 | 8.3 |
| Discharge Pressure | ° C. | 2.27 | 2.02 | 2.04 | 2.06 | 2.08 | 2.10 | 2.12 | 2.13 |

| Item | Unit | Example24 | Example25 | Com Ex15 | Example26 | Example27 | Example28 | Example29 | Example30 |
|---|---|---|---|---|---|---|---|---|---|
| HFO-1132 (E) | Mass % | 10.0 | 5.0 | 45.0 | 40.0 | 35.0 | 30.0 | 25.0 | 20.0 |
| HFO-1123 | Mass % | 50.0 | 55.0 | 15.0 | 20.0 | 25.0 | 30.0 | 35.0 | 40.0 |
| R1234(ze + yf) r = 0 | Mass % | 40.0 | 40.0 | 40.0 | 40.0 | 40.0 | 40.0 | 40.0 | 40.0 |

TABLE 7-continued

| Item | Unit | | | | | | | |
|---|---|---|---|---|---|---|---|---|
| GWP | — | 3 | 3 | 3 | 3 | 3 | 3 | 3 | 3 |
| COP ratio | % (Relative to R404A) | 99 | 98 | 105 | 104 | 103 | 102 | 102 | 101 |
| Refrigerating Capacity Ratio | % (Relative to R404A) | 101 | 100 | 104 | 104 | 104 | 103 | 103 | 102 |
| Condensation Glide | Mpa | 9.5 | 9.6 | 7.6 | 8.0 | 8.4 | 8.7 | 9.0 | 9.2 |
| Discharge Pressure | ° C. | 2.02 | 2.03 | 1.91 | 1.93 | 1.95 | 1.97 | 1.99 | 2.00 |

| Item | Unit | Example31 | Example32 | Example33 | Com Ex16 | Example34 | Example35 | Example36 | Example37 |
|---|---|---|---|---|---|---|---|---|---|
| HFO-1132 (E) | Mass % | 15.0 | 10.0 | 5.0 | 45.0 | 40.0 | 35.0 | 30.0 | 25.0 |
| HFO-1123 | Mass % | 45.0 | 45.0 | 50.0 | 10.0 | 15.0 | 20.0 | 25.0 | 30.0 |
| R1234(ze + yf) r = 0 | Mass % | 40.0 | 45.0 | 45.0 | 45.0 | 45.0 | 45.0 | 45.0 | 45.0 |
| GWP | — | 3 | 3 | 3 | 3 | 3 | 3 | 3 | 3 |
| COP ratio | % (Relative to R404A) | 100 | 100 | 100 | 106 | 105 | 105 | 104 | 103 |
| Refrigerating Capacity Ratio | % (Relative to R404A) | 102 | 94 | 93 | 98 | 98 | 97 | 97 | 97 |
| Condensation Glide | Mpa | 9.4 | 10.6 | 10.8 | 8.1 | 8.6 | 9.1 | 9.5 | 9.9 |
| Discharge Pressure | ° C. | 2.01 | 1.91 | 1.92 | 1.80 | 1.82 | 1.84 | 1.86 | 1.88 |

| Item | Unit | Example38 | Example39 | Example40 | Example41 | Com Ex17 | Example42 | Example43 | Example44 |
|---|---|---|---|---|---|---|---|---|---|
| HFO-1132 (E) | Mass % | 20.0 | 15.0 | 10.0 | 5.0 | 45.0 | 40.0 | 35.0 | 30.0 |
| HFO-1123 | Mass % | 35.0 | 40.0 | 40.0 | 45.0 | 5.0 | 10.0 | 15.0 | 20.0 |
| R1234(ze + yf) r = 0 | Mass % | 45.0 | 45.0 | 50.0 | 50.0 | 50.0 | 50.0 | 50.0 | 50.0 |
| GWP | — | 3 | 3 | 4 | 4 | 4 | 4 | 4 | 4 |
| COP ratio | % (Relative to R404A) | 102 | 101 | 102 | 101 | 107 | 107 | 106 | 105 |
| Refrigerating Capacity Ratio | % (Relative to R404A) | 96 | 95 | 88 | 87 | 92 | 92 | 91 | 91 |
| Discharge Pressure | Mpa | 10.2 | 10.4 | 11.6 | 11.8 | 8.4 | 9.0 | 9.6 | 10.1 |
| Condensation Glide | ° C. | 1.9 | 1.90 | 1.80 | 1.80 | 1.69 | 1.71 | 1.73 | 1.75 |

TABLE 8

| Item | Unit | Example45 | Example46 | Example47 | Example48 | Example49 | Example50 | Example51 | Example52 |
|---|---|---|---|---|---|---|---|---|---|
| HFO-1132 (E) | Mass % | 25.0 | 20.0 | 15.0 | 10.0 | 5.0 | 40.0 | 35.0 | 30.0 |
| HFO-1123 | Mass % | 25.0 | 30.0 | 35.0 | 35.0 | 40.0 | 5.0 | 10.0 | 15.0 |
| R1234(ze + yf) r = 0 | Mass % | 50.0 | 50.0 | 50.0 | 55.0 | 55.0 | 55.0 | 55.0 | 55.0 |
| GWP | — | 4 | 4 | 4 | 4 | 4 | 4 | 4 | 4 |
| COP ratio | % (Relative to R404A) | 104 | 103 | 103 | 103 | 102 | 108 | 107 | 106 |
| Refrigerating Capacity Ratio | % (Relative to R404A) | 90 | 90 | 89 | 82 | 81 | 86 | 85 | 85 |
| Condensation Glide | Mpa | 10.6 | 11.0 | 11.3 | 12.4 | 12.7 | 9.2 | 93 | 10.5 |
| Discharge Pressure | ° C. | 1.77 | 1.78 | 1.79 | 1.69 | 1.70 | 1.61 | 1.63 | 1.65 |

| Item | Unit | Example53 | Com Ex18 | Com Ex19 | Com Ex20 | Com Ex21 | Com Ex22 | Com Ex23 |
|---|---|---|---|---|---|---|---|---|
| HFO-1132 (E) | Mass % | 25.0 | 30.0 | 25.0 | 20.0 | 15.0 | 10.0 | 5.0 |
| HFO-1123 | Mass % | 20.0 | 5.0 | 10.0 | 15.0 | 20.0 | 25.0 | 30.0 |
| R1234(ze + yf) r = 0 | Mass % | 55.0 | 65.0 | 65.0 | 65.0 | 65.0 | 65.0 | 65.0 |
| GWP | — | 4 | 4 | 4 | 4 | 4 | 4 | 4 |
| COP ratio | % (Relative to R404A) | 106 | 109 | 108 | 107 | 106 | 105 | 105 |
| Refrigerating Capacity Ratio | % (Relative to R404A) | 84 | 74 | 73 | 72 | 71 | 70 | 69 |
| Condensation Glide | Mpa | 11.1 | 10.5 | 11.3 | 12.1 | 12.8 | 13.3 | 13.8 |
| Discharge Pressure | ° C. | 1.66 | 1.44 | 1.46 | 1.47 | 1.48 | 1.49 | 1.49 |

TABLE 9

| Item | Unit | Com Ex24 | Com Ex25 | Com Ex26 | Com Ex27 | Com Ex28 | Com Ex29 | Com Ex30 | Com Ex31 |
|---|---|---|---|---|---|---|---|---|---|
| HFO-1132 (E) | Mass % | 45.0 | 40.0 | 35.0 | 30.0 | 25.0 | 20.0 | 15.0 | 10.0 |
| HFO-1123 | Mass % | 25.0 | 30.0 | 35.0 | 40.0 | 45.0 | 50.0 | 55.0 | 55.0 |
| R1234(ze + yf) r = 0.25 | Mass % | 30.0 | 30.0 | 30.0 | 30.0 | 30.0 | 30.0 | 30.0 | 35.0 |
| GWP | — | 2 | 2 | 2 | 2 | 2 | 2 | 2 | 3 |
| COP ratio | % (Relative to R404A) | 102 | 101 | 100 | 99 | 99 | 98 | 97 | 98 |
| Refrigerating Capacity Ratio | % (Relative to R404A) | 121 | 121 | 121 | 121 | 121 | 121 | 120 | 112 |
| Condensation Glide | Mpa | 5.4 | 5.6 | 5.8 | 5.9 | 6.0 | 6.1 | 6.2 | 7.5 |
| Discharge Pressure | ° C. | 2.17 | 2.20 | 2.22 | 2.24 | 2.27 | 2.28 | 2.30 | 2.19 |

| Item | Unit | Com Ex32 | Com Ex33 | Example54 | Example55 | Example56 | Com Ex34 | Example57 | Example58 |
|---|---|---|---|---|---|---|---|---|---|
| HFO-1132 (E) | Mass % | 5.0 | 45.0 | 40.0 | 35.0 | 30.0 | 45.0 | 40.0 | 35.0 |
| HFO-1123 | Mass % | 60.0 | 20.0 | 25.0 | 25.0 | 30.0 | 15.0 | 20.0 | 25.0 |
| R1234(ze + yf) r = 0.25 | Mass % | 35.0 | 35.0 | 35.0 | 40.0 | 40.0 | 40.0 | 40.0 | 40.0 |
| GWP | — | 3 | 3 | 3 | 3 | 3 | 3 | 3 | 3 |
| COP ratio | % (Relative to R404A) | 96.8 | 103.0 | 102.2 | 102.6 | 101.8 | 104.2 | 103.3 | 102.5 |
| Refrigerating Capacity Ratio | % (Relative to R404A) | 110.9 | 114.6 | 114.7 | 107.5 | 107.3 | 108.2 | 108.2 | 108.0 |
| Condensation Glide | Mpa | 7.5 | 6.1 | 6.4 | 7.5 | 7.8 | 6.6 | 7.0 | 7.4 |
| Discharge Pressure | ° C. | 2.20 | 2.06 | 2.09 | 2.00 | 2.02 | 1.96 | 1.98 | 2.00 |

| Item | Unit | Example59 | Example60 | Example61 | Example62 | Example63 | Example64 | Com Ex35 | Example65 |
|---|---|---|---|---|---|---|---|---|---|
| HFO-1132 (E) | Mass % | 30.0 | 25.0 | 20.0 | 15.0 | 10.0 | 5.0 | 45.0 | 40.0 |
| HFO-1123 | Mass % | 30.0 | 35.0 | 40.0 | 45.0 | 45.0 | 50.0 | 10.0 | 15.0 |
| R1234(ze + yf) r = 0.25 | Mass % | 40.0 | 40.0 | 40.0 | 40.0 | 45.0 | 45.0 | 45.0 | 45.0 |
| GWP | — | 3 | 3 | 3 | 3 | 3 | 3 | 3 | 3 |
| COP ratio | % (Relative to R404A) | 102 | 101 | 100 | 99 | 100 | 100 | 106 | 105 |
| Refrigerating Capacity Ratio | % (Relative to R404A) | 108 | 107 | 107 | 106 | 94 | 93 | 98 | 98 |
| Condensation Glide | Mpa | 7.6 | 7.9 | 8.1 | 8.3 | 10.6 | 10.8 | 8.1 | 8.6 |
| Discharge Pressure | ° C. | 2.03 | 2.04 | 2.06 | 2.07 | 1.91 | 1.92 | 1.80 | 1.82 |

| Item | Unit | Example66 | Example67 | Example68 | Example69 | Example70 | Example71 | Example72 | Com Ex36 |
|---|---|---|---|---|---|---|---|---|---|
| HFO-1132 (E) | Mass % | 35.0 | 30.0 | 25.0 | 20.0 | 15.0 | 10.0 | 5.0 | 45.0 |
| HFO-1123 | Mass % | 20.0 | 25.0 | 30.0 | 35.0 | 40.0 | 40.0 | 45.0 | 5.0 |
| R1234(ze + yf) r = 0.25 | Mass % | 45.0 | 45.0 | 45.0 | 45.0 | 45.0 | 50.0 | 50.0 | 50.0 |
| GWP | — | 3 | 3 | 3 | 3 | 3 | 3 | 3 | 3 |
| COP ratio | % (Relative to R404A) | 105 | 103 | 102 | 101 | 100 | 101 | 100 | 107 |
| Refrigerating Capacity Ratio | % (Relative to R404A) | 97 | 101 | 101 | 101 | 100 | 92 | 91 | 96 |
| Condensation Glide | Mpa | 9.1 | 8.4 | 8.7 | 9.0 | 9.2 | 10.4 | 10.6 | 73 |
| Discharge Pressure | ° C. | 1.84 | 1.92 | 1.94 | 1.95 | 1.97 | 1.86 | 1.87 | 1.75 |

| Item | Unit | Example73 | Example74 | Example75 | Example76 | Example77 | Example78 | Example79 | Example80 |
|---|---|---|---|---|---|---|---|---|---|
| HFO-1132 (E) | Mass % | 40.0 | 35.0 | 30.0 | 25.0 | 20.0 | 15.0 | 10.0 | 5.0 |
| HFO-1123 | Mass % | 10.0 | 15.0 | 20.0 | 25.0 | 30.0 | 35.0 | 35.0 | 40.0 |
| R1234(ze + yf) r = 0.25 | Mass % | 50.0 | 50.0 | 50.0 | 50.0 | 50.0 | 50.0 | 55.0 | 55.0 |
| GWP | — | 3 | 3 | 3 | 3 | 3 | 3 | 4 | 4 |
| COP ratio | % (Relative to R404A) | 106 | 105 | 104 | 103 | 102 | 102 | 102 | 101 |
| Refrigerating Capacity Ratio | % (Relative to R404A) | 96 | 96 | 95 | 95 | 94 | 94 | 86 | 85 |
| Discharge Pressure | Mpa | 7.9 | 8.4 | 8.9 | 9.4 | 9.7 | 10.1 | 11.2 | 11.5 |
| Condensation Glide | ° C. | 1.8 | 1.79 | 1.81 | 1.83 | 1.85 | 1.86 | 1.76 | 1.76 |

TABLE 10

| Item | Unit | Example81 | Example82 | Example83 | Example84 | Example85 | Example86 | Example87 | Example88 |
|---|---|---|---|---|---|---|---|---|---|
| HFO-1132 (E) | Mass % | 40.0 | 35.0 | 30.0 | 25.0 | 20.0 | 15.0 | 10.0 | 5.0 |
| HFO-1123 | Mass % | 5.0 | 10.0 | 15.0 | 20.0 | 25.0 | 30.0 | 35.0 | 40.0 |

TABLE 10-continued

| Item | Unit | | | | | | | | |
|---|---|---|---|---|---|---|---|---|---|
| R1234(ze + yf) r = 0.25 | Mass % | 55.0 | 55.0 | 55.0 | 55.0 | 55.0 | 55.0 | 55.0 | 55.0 |
| GWP | — | 3 | 3 | 3 | 3 | 3 | 3 | 3 | 3 |
| COP ratio | % (Relative to R404A) | 107 | 106 | 105 | 104 | 104 | 103 | 102 | 101 |
| Refrigerating Capacity Ratio | % (Relative to R404A) | 90 | 90 | 89 | 89 | 88 | 88 | 87 | 86 |
| Condensation Glide | Mpa | 8.0 | 8.7 | 9.3 | 9.8 | 10.3 | 10.7 | 11.1 | 11.3 |
| Discharge Pressure | °C. | 1.67 | 1.69 | 1.71 | 1.73 | 1.74 | 1.75 | 1.76 | 1.77 |

| Item | Unit | Example89 | Example90 | Example91 | Com Ex37 | Com Ex38 | Com Ex39 | Com Ex40 | Com Ex41 |
|---|---|---|---|---|---|---|---|---|---|
| HFO-1132 (E) | Mass % | 35.0 | 30.0 | 25.0 | 25.0 | 20.0 | 15.0 | 10.0 | 5.0 |
| HFO-1123 | Mass % | 5.0 | 10.0 | 15.0 | 5.0 | 10.0 | 15.0 | 20.0 | 25.0 |
| R1234(ze + yf) r = 0.25 | Mass % | 60.0 | 60.0 | 60.0 | 70.0 | 70.0 | 70.0 | 70.0 | 70.0 |
| GWP | — | 4 | 4 | 4 | 4 | 4 | 4 | 4 | 4 |
| COP ratio | % (Relative to R404A) | 107 | 107 | 106 | 108 | 107 | 106 | 105 | 105 |
| Refrigerating Capacity Ratio | % (Relative to R404A) | 84 | 84 | 83 | 72 | 72 | 71 | 70 | 69 |
| Condensation Glide | Mpa | 8.7 | 9.4 | 10.1 | 9.7 | 10.5 | 11.3 | 11.9 | 12.5 |
| Discharge Pressure | °C. | 1.59 | 1.61 | 1.62 | 1.42 | 1.44 | 1.45 | 1.46 | 1.46 |

| Item | Unit | Com Ex42 | Com Ex43 | Com Ex44 | Com Ex45 | Com Ex46 | Com Ex47 | Com Ex48 | Com Ex49 |
|---|---|---|---|---|---|---|---|---|---|
| HFO-1132 (E) | Mass % | 45.0 | 40.0 | 35.0 | 30.0 | 25.0 | 20.0 | 15.0 | 10.0 |
| HFO-1123 | Mass % | 25.0 | 30.0 | 35.0 | 40.0 | 45.0 | 45.0 | 50.0 | 55.0 |
| R1234(ze + yf) r = 0.5 | Mass % | 30.0 | 30.0 | 30.0 | 30.0 | 30.0 | 35.0 | 35.0 | 35.0 |
| GWP | — | 2 | 2 | 2 | 2 | 2 | 2 | 2 | 2 |
| COP ratio | % (Relative to R404A) | 102 | 101 | 100 | 99 | 99 | 98 | 98 | 97 |
| Refrigerating Capacity Ratio | % (Relative to R404A) | 121 | 121 | 121 | 121 | 121 | 118 | 118 | 117 |
| Condensation Glide | Mpa | 5.4 | 5.6 | 5.8 | 5.9 | 6.0 | 6.2 | 6.3 | 6.3 |
| Discharge Pressure | °C. | 2.17 | 2.20 | 2.22 | 2.24 | 2.27 | 2.23 | 2.24 | 2.26 |

| item | Unit | Com Ex50 | Com Ex51 | Example92 | Example93 | Example94 | Example95 | Example96 | Com Ex52 |
|---|---|---|---|---|---|---|---|---|---|
| HFO-1132 (E) | Mass % | 5.0 | 45.0 | 40.0 | 35.0 | 30.0 | 25.0 | 20.0 | 45.0 |
| HFO-1123 | Mass % | 60.0 | 15.0 | 20.0 | 25.0 | 30.0 | 35.0 | 40.0 | 10.0 |
| R1234(ze + yf) r = 0.5 | Mass % | 35.0 | 40.0 | 40.0 | 40.0 | 40.0 | 40.0 | 40.0 | 45.0 |
| GWP | — | 2 | 3 | 3 | 3 | 3 | 3 | 3 | 3 |
| COP ratio | % (Relative to R404A) | 96.2 | 103.5 | 102.7 | 101.9 | 101.1 | 100.3 | 99.5 | 104.6 |
| Refrigerating Capacity Ratio | % (Relative to R404A) | 116.3 | 112.4 | 112.5 | 112.4 | 112.3 | 112.0 | 111.6 | 106.4 |
| Condensation Glide | Mpa | 6.4 | 5.7 | 6.1 | 6.4 | 6.6 | 6.9 | 7.1 | 6.1 |
| Discharge Pressure | °C. | 2.27 | 2.01 | 2.03 | 2.06 | 2.08 | 2.10 | 2.12 | 1.91 |

| Item | Unit | Example97 | Example98 | Example99 | Example100 | Example101 | Example102 | Example103 | Example104 |
|---|---|---|---|---|---|---|---|---|---|
| HFO-1132 (E) | Mass % | 40.0 | 35.0 | 30.0 | 25.0 | 20.0 | 15.0 | 10.0 | 5.0 |
| HFO-1123 | Mass % | 15.0 | 20.0 | 25.0 | 30.0 | 35.0 | 40.0 | 40.0 | 45.0 |
| R1234(ze + yf) r = 0.5 | Mass % | 45.0 | 45.0 | 45.0 | 45.0 | 45.0 | 45.0 | 50.0 | 50.0 |
| GWP | — | 3 | 3 | 3 | 3 | 3 | 3 | 3 | 3 |
| COP ratio | % (Relative to R404A) | 104 | 103 | 102 | 101 | 101 | 100 | 100 | 99 |
| Refrigerating Capacity Ratio | % (Relative to R404A) | 106 | 106 | 106 | 106 | 105 | 105 | 97 | 96 |
| Condensation Glide | Mpa | 6.5 | 5.9 | 7.3 | 7.6 | 7.9 | 8.1 | 9.3 | 9.5 |
| Discharge Pressure | °C. | 1.93 | 1.96 | 1.98 | 2.00 | 2.02 | 2.03 | 1.92 | 1.93 |

| Item | Unit | Com Ex53 | Example105 | Example106 | Example107 | Example108 | Example109 | Example110 | Example111 |
|---|---|---|---|---|---|---|---|---|---|
| HFO-1132 (E) | Mass % | 45.0 | 40.0 | 350 | 30.0 | 25.0 | 20.0 | 15.0 | 10.0 |
| HFO-1123 | Mass % | 5.0 | 10.0 | 15.0 | 20.0 | 25.0 | 30.0 | 35.0 | 35.0 |
| R1234(ze + yf) r = 0.5 | Mass % | 50.0 | 50.0 | 50.0 | 50.0 | 50.0 | 50.0 | 50.0 | 55.0 |
| GWP | — | 3 | 3 | 3 | 3 | 3 | 3 | 3 | 3 |
| COP ratio | % (Relative to R404A) | 106 | 105 | 104 | 103 | 102 | 102 | 101 | 101 |
| Refrigerating Capacity Ratio | % (Relative to R404A) | 100 | 100 | 100 | 100 | 100 | 99 | 99 | 91 |
| Condensation Glide | Mpa | 6.2 | 5.8 | 7.3 | 7.8 | 8.2 | 8.5 | 8.8 | 10.0 |
| Discharge Pressure | °C. | 1.81 | 1.83 | 1.85 | 1.87 | 1.89 | 1.91 | 1.92 | 1.82 |

TABLE 10-continued

| Item | Unit | Example112 | Example113 | Example114 | Example115 | Example116 | Example117 | Example118 | Example119 |
|---|---|---|---|---|---|---|---|---|---|
| HFO-1132 (E) | Mass % | 5.0 | 40.0 | 35.0 | 30.0 | 25.0 | 20.0 | 15.0 | 10.0 |
| HFO-1123 | Mass % | 40.0 | 5.0 | 10.0 | 15.0 | 20.0 | 25.0 | 30.0 | 35.0 |
| R1234(ze + yf) r = 0.5 | Mass % | 55.0 | 55.0 | 55.0 | 55.0 | 55.0 | 55.0 | 55.0 | 55.0 |
| GWP | — | 3 | 3 | 3 | 3 | 3 | 3 | 3 | 3 |
| COP ratio | % (Relative to R404A) | 101 | 106 | 105 | 104 | 104 | 103 | 102 | 101 |
| Refrigerating Capacity Ratio | % (Relative to R404A) | 90 | 95 | 95 | 94 | 94 | 93 | 93 | 92 |
| Discharge Pressure | Mpa | 10.3 | 6.9 | 7.6 | 8.1 | 8.6 | 9.1 | 9.5 | 9.8 |
| Condensation Glide | ° C. | 1.8 | 1.73 | 1.75 | 1.77 | 1.79 | 1.81 | 1.82 | 1.83 |

TABLE 12

| Item | Unit | Example120 | Example121 | Example122 | Example123 | Example124 | Example125 | Example126 | Example127 |
|---|---|---|---|---|---|---|---|---|---|
| HFO-1132 (E) | Mass % | 5.0 | 35.0 | 30.0 | 25.0 | 20.0 | 15.0 | 10.0 | 5.0 |
| HFO-1123 | Mass % | 40.0 | 5.0 | 10.0 | 15.0 | 20.0 | 25.0 | 30.0 | 35.0 |
| R1234(ze + yf) r = 0.5 | Mass % | 55.0 | 60.0 | 60.0 | 60.0 | 60.0 | 60.0 | 60.0 | 60.0 |
| GWP | — | 3 | 3 | 3 | 3 | 3 | 3 | 3 | 3 |
| COP ratio | % (Relative to R404A) | 100 | 106 | 105 | 105 | 104 | 103 | 102 | 101 |
| Refrigerating Capacity Ratio | % (Relative to R404A) | 91 | 89 | 89 | 88 | 88 | 87 | 86 | 85 |
| Condensation Glide | Mpa | 10.0 | 7.5 | 8.2 | 8.9 | 9.4 | 9.9 | 10.3 | 10.7 |
| Discharge Pressure | ° C. | 1.84 | 1.65 | 1.67 | 1.69 | 1.71 | 1.72 | 1.73 | 1.74 |

| Item | Unit | Example128 | Example129 | Com Ex54 | Com Ex55 | Com Ex56 | Com Ex57 |
|---|---|---|---|---|---|---|---|
| HFO-1132 (E) | Mass % | 30.0 | 25.0 | 20.0 | 15.0 | 10.0 | 5.0 |
| HFO-1123 | Mass % | 5.0 | 10.0 | 10.0 | 15.0 | 20.0 | 25.0 |
| R1234(ze + yf) r = 0.5 | Mass % | 65.0 | 65.0 | 70.0 | 70.0 | 70.0 | 70.0 |
| GWP | — | 4 | 4 | 4 | 4 | 4 | 4 |
| COP ratio | % (Relative to R404A) | 107 | 106 | 106 | 105 | 104 | 104 |
| Refrigerating Capacity Ratio | % (Relative to R404A) | 83 | 83 | 77 | 76 | 75 | 74 |
| Condensation Glide | Mpa | 8.1 | 8.8 | 9.3 | 10.0 | 10.7 | 11.2 |
| Discharge Pressure | ° C. | 1.57 | 1.59 | 1.50 | 1.52 | 1.53 | 1.53 |

TABLE 13

| Item | Unit | Com Ex58 | Com Ex59 | Com Ex60 | Com Ex61 | Com Ex62 | Com Ex63 | Com Ex64 | Com Ex65 |
|---|---|---|---|---|---|---|---|---|---|
| HFO-1132 (E) | Mass % | 45.0 | 40.0 | 35.0 | 30.0 | 25.0 | 20.0 | 15.0 | 10.0 |
| HFO-1123 | Mass % | 20.0 | 25.0 | 30.0 | 35.0 | 40.0 | 45.0 | 50.0 | 55.0 |
| R1234(ze + yf) r = 0.75 | Mass % | 35.0 | 35.0 | 35.0 | 35.0 | 35.0 | 35.0 | 35.0 | 35.0 |
| GWP | — | 2 | 2 | 2 | 2 | 2 | 2 | 2 | 2 |
| COP ratio | % (Relative to R404A) | 102 | 101 | 100 | 99 | 99 | 98 | 97 | 96 |
| Refrigerating Capacity Ratio | % (Relative to R404A) | 123 | 123 | 123 | 123 | 123 | 123 | 122 | 122 |
| Condensation Glide | Mpa | 4.4 | 4.7 | 4.9 | 5.0 | 5.2 | 5.3 | 5.4 | 5.4 |
| Discharge Pressure | ° C. | 2.16 | 2.19 | 2.21 | 2.24 | 2.26 | 2.28 | 2.30 | 2.31 |

| Item | Unit | Com Ex66 | Com Ex67 | Example130 | Example131 | Example132 | Com Ex65 | Example133 | Example134 |
|---|---|---|---|---|---|---|---|---|---|
| HFO-1132 (E) | Mass % | 5.0 | 45.0 | 40.0 | 35.0 | 30.0 | 45.0 | 40.0 | 35.0 |
| HFO-1123 | Mass % | 60.0 | 15.0 | 20.0 | 25.0 | 30.0 | 10.0 | 15.0 | 20.0 |
| R1234(ze + yf) r = 0.75 | Mass % | 35.0 | 40.0 | 40.0 | 40.0 | 40.0 | 45.0 | 45.0 | 45.0 |
| GWP | — | 2 | 2 | 2 | 2 | 2 | 3 | 3 | 3 |
| COP ratio | % (Relative to R404A) | 95.8 | 102.9 | 102.1 | 101.3 | 100.5 | 103.9 | 103.1 | 102.3 |

TABLE 13-continued

| | | | | | | | | |
|---|---|---|---|---|---|---|---|---|
| Refrigerating Capacity Ratio | % (Relative to R404A) | 121.3 | 116.7 | 116.9 | 116.9 | 116.9 | 110.8 | 111.0 | 111.0 |
| Condensation Glide | Mpa | 5.5 | 4.9 | 5.2 | 5.5 | 5.7 | 5.1 | 5.6 | 6.0 |
| Discharge Pressure | ° C. | 2.33 | 2.06 | 2.09 | 2.11 | 2.14 | 1.96 | 1.99 | 2.01 |

| Item | Unit | Example135 | Example136 | Example137 | Example138 | Example139 | Example140 | ComEx68 | Example141 |
|---|---|---|---|---|---|---|---|---|---|
| HFO-1132 (E) | Mass % | 30.0 | 25.0 | 20.0 | 15.0 | 10.0 | 5.0 | 45.0 | 40.0 |
| HFO-1123 | Mass % | 25.0 | 30.0 | 35.0 | 40.0 | 45.0 | 50.0 | 5.0 | 10.0 |
| R1234(ze + yf) r = 0.75 | Mass % | 45.0 | 45.0 | 45.0 | 45.0 | 45.0 | 45.0 | 50.0 | 50.0 |
| GWP | — | 3 | 3 | 3 | 3 | 3 | 3 | 3 | 3 |
| COP ratio | % (Relative to R404A) | 101 | 101 | 100 | 99 | 98 | 98 | 105 | 104 |
| Refrigerating Capacity Ratio | % (Relative to R404A) | 111 | 111 | 110 | 110 | 109 | 108 | 105 | 105 |
| Condensation Glide | Mpa | 6.3 | 6.6 | 6.8 | 7.0 | 7.2 | 7.3 | 5.3 | 5.8 |
| Discharge Pressure | ° C. | 2.04 | 2.06 | 2.08 | 2.09 | 2.11 | 2.12 | 1.86 | 1.89 |

| Item | Unit | Example142 | Example143 | Example144 | Example145 | Example146 | Example147 | Example148 | Example149 |
|---|---|---|---|---|---|---|---|---|---|
| HFO-1132 (E) | Mass % | 35.0 | 30.0 | 25.0 | 20.0 | 15.0 | 10.0 | 5.0 | 40.0 |
| HFO-1123 | Mass % | 15.0 | 20.0 | 25.0 | 30.0 | 35.0 | 40.0 | 45.0 | 5.0 |
| R1234(ze + yf) r = 0.75 | Mass % | 50.0 | 50.0 | 50.0 | 50.0 | 50.0 | 50.0 | 50.0 | 55.0 |
| GWP | — | 3 | 3 | 3 | 3 | 3 | 3 | 3 | 3 |
| COP ratio | % (Relative to R404A) | 103 | 102 | 102 | 101 | 100 | 99 | 99 | 105 |
| Refrigerating Capacity Ratio | % (Relative to R404A) | 105 | 105 | 105 | 104 | 104 | 103 | 102 | 99 |
| Condensation Glide | Mpa | 6.3 | 6.8 | 7.1 | 7.5 | 7.7 | 8.0 | 8.2 | 5.9 |
| Discharge Pressure | ° C. | 1.91 | 1.94 | 1.96 | 1.97 | 1.99 | 2.00 | 2.01 | 1.79 |

| Item | Unit | Example150 | Example151 | Example152 | Example153 | Example154 | Example155 | Example156 | Example157 |
|---|---|---|---|---|---|---|---|---|---|
| HFO-1132 (E) | Mass % | 35.0 | 30.0 | 25.0 | 20.0 | 15.0 | 10.0 | 5.0 | 35.0 |
| HFO-1123 | Mass % | 10.0 | 15.0 | 20.0 | 25.0 | 30.0 | 35.0 | 40.0 | 5.0 |
| R1234(ze + yf) r = 0.75 | Mass % | 55.0 | 55.0 | 55.0 | 55.0 | 55.0 | 55.0 | 55.0 | 60.0 |
| GWP | — | 3 | 3 | 3 | 3 | 3 | 3 | 3 | 3 |
| COP ratio | % (Relative to R404A) | 104 | 104 | 103 | 102 | 101 | 100 | 100 | 105 |
| Refrigerating Capacity Ratio | % (Relative to R404A) | 99 | 99 | 99 | 98 | 98 | 97 | 96 | 94 |
| Discharge Pressure | Mpa | 6.5 | 7.1 | 7.5 | 8.0 | 8.3 | 8.6 | 8.9 | 6.5 |
| Condensation Glide | ° C. | 1.8 | 1.84 | 1.86 | 1.87 | 1.89 | 1.90 | 1.91 | 1.71 |

TABLE 14

| Item | Unit | Example158 | Example159 | Example160 | Example161 | Example162 | Example163 | Example164 | Example165 |
|---|---|---|---|---|---|---|---|---|---|
| HFO-1132 (E) | Mass % | 30.0 | 25.0 | 20.0 | 15.0 | 10.0 | 5.0 | 30.0 | 25.0 |
| HFO-1123 | Mass % | 10.0 | 15.0 | 20.0 | 25.0 | 30.0 | 35.0 | 5.0 | 10.0 |
| R1234(ze + yf) r = 0.75 | Mass % | 60.0 | 60.0 | 60.0 | 60.0 | 60.0 | 60.0 | 65.0 | 65.0 |
| GWP | — | 3 | 3 | 3 | 3 | 3 | 3 | 3 | 3 |
| COP ratio | % (Relative to R404A) | 105 | 104 | 103 | 102 | 101 | 101 | 106 | 105 |
| Refrigerating Capacity Ratio | % (Relative to R404A) | 93 | 93 | 93 | 92 | 91 | 90 | 88 | 88 |
| Condensation Glide | Mpa | 7.2 | 7.8 | 8.3 | 8.8 | 9.2 | 9.5 | 7.0 | 7.7 |
| Discharge Pressure | ° C. | 1.73 | 1.75 | 1.77 | 1.79 | 1.80 | 1.81 | 1.63 | 1.65 |

| Item | Unit | Example166 | Example167 | Example168 | Example169 | ComEx69 | ComEx70 | ComEx71 | ComEx72 |
|---|---|---|---|---|---|---|---|---|---|
| HFO-1132 (E) | Mass % | 20.0 | 15.0 | 10.0 | 5.0 | 20.0 | 15.0 | 10.0 | 5.0 |
| HFO-1123 | Mass % | 15.0 | 20.0 | 25.0 | 30.0 | 5.0 | 10.0 | 15.0 | 20.0 |
| R1234(ze + yf) r = 0.75 | Mass % | 65.0 | 65.0 | 65.0 | 65.0 | 75.0 | 75.0 | 75.0 | 75.0 |
| GWP | — | 3 | 3 | 3 | 3 | 4 | 4 | 4 | 4 |
| COP ratio | % (Relative to R404A) | 104 | 103 | 102 | 102 | 106 | 105 | 104 | 104 |

TABLE 14-continued

| Refrigerating Capacity Ratio | % (Relative to R404A) | 87 | 86 | 86 | 85 | 76 | 76 | 75 | 74 |
|---|---|---|---|---|---|---|---|---|---|
| Condensation Glide | Mpa | 8.4 | 9.0 | 9.5 | 9.9 | 7.7 | 8.5 | 9.3 | 9.9 |
| Discharge Pressure | ° C. | 1.67 | 1.69 | 1.70 | 1.71 | 1.47 | 1.48 | 1.49 | 1.50 |

DESCRIPTION OF THE REFERENCE NUMERALS

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132(E)), trifluoroethylene (HFO-1123), and 1,3,3,3-tetrafluoropropene (R1234ze),
wherein
when the mass % of HFO-1132(E), HFO-1123, and R1234ze based on their sum in the refrigerant is respectively x, y, and z, coordinates (x,y,z) in a ternary composition diagram in which the sum of HFO-1132(E), HFO-1123, and R1234ze is 100 mass % fall within a figure surrounded by line segments EJ, JC, CD, DF, and FE, which connect the following 5 points, or fall on any of line segments EJ, CD, and FE, but not fall on point J, point C, point D, or point F:

point E (42.5, 27.9, 29.6),
point J (42.5, 1.0, 56.5),
point C (39.1, 1.0, 59.9),
point D (1.0, 44.4, 54.6), and
point F (1.0, 64.0, 35.0),
line segments EJ, JC, and DF are straight lines,
coordinates (x,y,z) of a point on line segment CD are represented by (x, $0.0021x^2-1.2228x+45.621$, $-0.0021x^2+0.2228x+54.379$), and
coordinates (x,y,z) of a point on line segment FE are represented by (x, $0.0025x^2-0.979x+64.976$, $-0.0025x^2-0.021x+35.024$).

2. The composition according to claim 1, which is for use as a working fluid for a refrigerating machine, the composition further comprising a refrigeration oil.

3. The composition according to claim 1, which is for use as an alternative refrigerant for R404A.

4. A method for operating a refrigerating machine, comprising circulating the composition of claim 1 as a working fluid in a refrigerating machine.

5. A method for operating a refrigerating machine, comprising circulating the composition of claim 1 as a working fluid in a refrigerating machine, wherein the composition is an alternative refrigerant for R404A.

6. A refrigerating machine comprising the composition of claim 1 as a working fluid.

* * * * *